(12) United States Patent
Laird-McConnell

(10) Patent No.: US 8,028,032 B2
(45) Date of Patent: Sep. 27, 2011

(54) EMAIL MESSAGES

(75) Inventor: Tom Laird-McConnell, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 73 days.

(21) Appl. No.: 12/203,926

(22) Filed: Sep. 4, 2008

(65) Prior Publication Data

US 2010/0057864 A1 Mar. 4, 2010

(51) Int. Cl.
*G06F 15/16* (2006.01)
(52) U.S. Cl. .................. 709/206; 715/788; 715/205
(58) Field of Classification Search .................. 709/206
See application file for complete search history.

(56) References Cited

U.S. PATENT DOCUMENTS

| | | | | |
|---|---|---|---|---|
| 5,418,908 A * | 5/1995 | Keller et al. | ............ | 709/206 |
| 5,937,160 A * | 8/1999 | Davis et al. | ............ | 709/203 |
| 6,144,991 A * | 11/2000 | England | ............ | 709/205 |
| 6,496,849 B1 * | 12/2002 | Hanson et al. | ............ | 709/200 |
| 6,728,934 B1 | 4/2004 | Scopes | | |
| 6,769,013 B2 | 7/2004 | Frees et al. | | |
| 6,772,229 B1 | 8/2004 | Achacoso et al. | | |
| 7,055,091 B1 * | 5/2006 | Williams | ............ | 715/205 |
| 7,149,959 B1 | 12/2006 | Jones et al. | | |
| 7,219,129 B2 * | 5/2007 | Weissman | ............ | 709/206 |
| 7,219,130 B2 * | 5/2007 | Kumar et al. | ............ | 709/206 |
| 7,222,156 B2 * | 5/2007 | Gupta et al. | ............ | 709/206 |
| 7,231,426 B1 * | 6/2007 | Hall et al. | ............ | 709/206 |
| 2002/0188685 A1 * | 12/2002 | Bhogal et al. | ............ | 709/206 |
| 2004/0123157 A1 * | 6/2004 | Alagna et al. | ............ | 713/201 |
| 2005/0235220 A1 * | 10/2005 | Duperrouzel et al. | ........ | 715/788 |
| 2006/0242663 A1 * | 10/2006 | Gogerty | ............ | 725/34 |
| 2007/0094725 A1 * | 4/2007 | Borders | ............ | 726/22 |
| 2007/0174394 A1 * | 7/2007 | Jayaweera | ............ | 709/206 |
| 2007/0282956 A1 * | 12/2007 | Staats | ............ | 709/206 |
| 2008/0005247 A9 * | 1/2008 | Khoo | ............ | 709/206 |
| 2008/0005678 A1 * | 1/2008 | Buttner et al. | ............ | 715/744 |
| 2008/0120382 A1 * | 5/2008 | Heidloff et al. | ............ | 709/206 |
| 2008/0256187 A1 * | 10/2008 | Kay | ............ | 709/206 |
| 2009/0132949 A1 * | 5/2009 | Bosarge | ............ | 715/777 |
| 2009/0287780 A1 * | 11/2009 | Gawor et al. | ............ | 709/206 |
| 2009/0319620 A1 * | 12/2009 | Gross et al. | ............ | 709/206 |
| 2009/0328169 A1 * | 12/2009 | Hutchison et al. | ............ | 726/7 |
| 2010/0017878 A1 * | 1/2010 | McBrearty et al. | ............ | 726/22 |

OTHER PUBLICATIONS

Whitehead, et al.,"WebDAV", Retrieved at<< http://www.ics.uci.edu/~ejw/papers/dav-ecscw.pdf >>, pp. 21, 1999.
"Checkpoint Research Efficiency", Retrieved at<< http://ria.thomson.com/integratedsolutions/efficiency.asp >>, Jul. 17, 2008, pp. 3.
"How to Add a Link to a Web Page", Retrieved at<< http://www.ehow.com/how_5372_add-link-web.html >>, Jul. 17, 2008, pp. 3.
"Email a Web Link Instantly", Retrieved at<< http://www.apple.com/findouthow/mac/#tutorial=link >>, Jul. 17, 2008, p. 1.
"Using a Wiki for Documentation and Collaborative Authoring", Retrieved at<< http://urlgreyhot.com/personal/publications/using_a_wiki_for_documentation_and_collaborative_authoring >>, Jul. 17, 2008, pp. 6.

* cited by examiner

*Primary Examiner* — Firmin Backer
*Assistant Examiner* — Hamza Algibhah

(57) ABSTRACT

The described implementations relate to email messages. One technique detects a link to a web-site in an email message. The technique causes content from the web-site to be visualized on a common display area with the email message for a recipient of the email message.

19 Claims, 5 Drawing Sheets

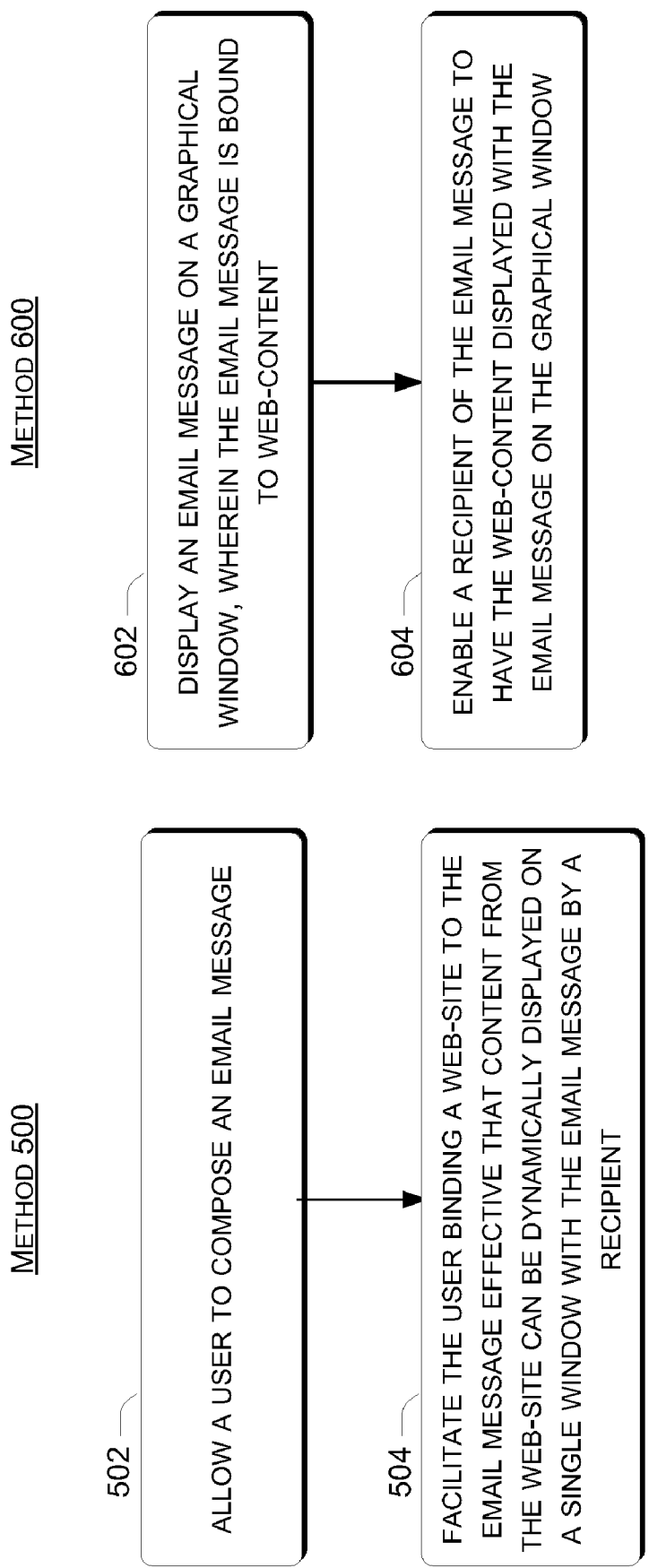

EMAIL MESSAGES

BACKGROUND

Computer users often use email messages to discuss topics of interest. For instance, the topic could be a news story from a web-site or a document. Traditionally, a sender composed an email message that discussed the topic for delivery to one or more recipients. The sender could attach a document relating to the topic to the email message, or include a link to a web-site relating to the topic in the email message. The recipient's email application would display the email message on one display area such as a graphical window. The recipient could cause the attachment or document to be opened by another application on a different display area such as another graphical window. In order to understand the discussion in the email message the recipient may need to repeatedly refer from the email message to the different display area and back again. At the least this referencing back and forth tends to diminish the quality of the recipients' experience. Further, such back and forth referencing tends to break the recipient's train of thought and make it harder for the recipient to follow the discussion. The present concepts address these and other issues surrounding email messages.

SUMMARY

The described implementations relate to email messages. One technique detects a link to a web-site in an email message. The technique causes content from the web-site to be visualized on a common display area with the email message for a recipient of the email message.

Another implementation is manifested as a system that includes an email application configured to display an email message on a first portion of a graphical window. The system also includes a browser module associated with the email application to automatically retrieve and display web-site content on a second portion of the graphical window. The above listed examples are intended to provide a quick reference to aid the reader and are not intended to define the scope of the concepts described herein.

BRIEF DESCRIPTION OF THE DRAWINGS

The accompanying drawings illustrate implementations of the concepts conveyed in the present application. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the Figure and associated discussion where the reference number is first introduced.

FIGS. 5-6 are flowcharts of exemplary email messaging technique in accordance with some implementations of the present concepts.

DETAILED DESCRIPTION

Overview

This patent application pertains to email, and specifically to visualizing an email message and associated web-content on a common display area. Given that many email discussions relate to web content, a composer or sender can compose an email message and bind a web-site(s) that contains web content to the email message. A recipient of the email message can view both the email message and the associated web content on a common display area such as a graphical window. Viewing the email message and the associated web content on a common display area can make it easier for the email recipient to follow the content of the email message when compared to more traditional scenarios where the web content is displayed in a different display area.

Exemplary Screenshots

Figure 1:
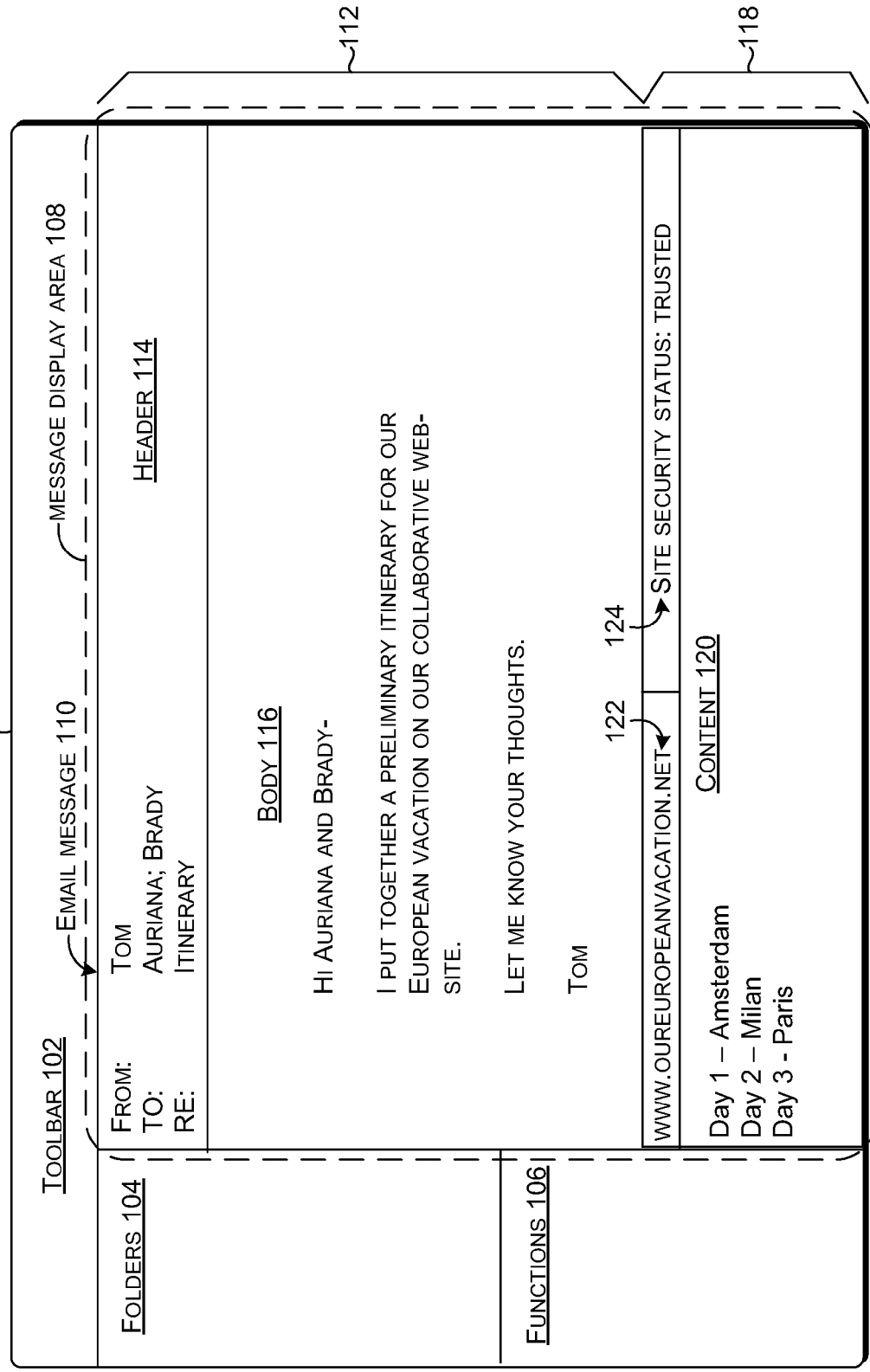
FIGS. 1-3 show hypothetical screenshots of exemplary email message concepts in accordance with some implementations of the present concepts.
Figure 2:
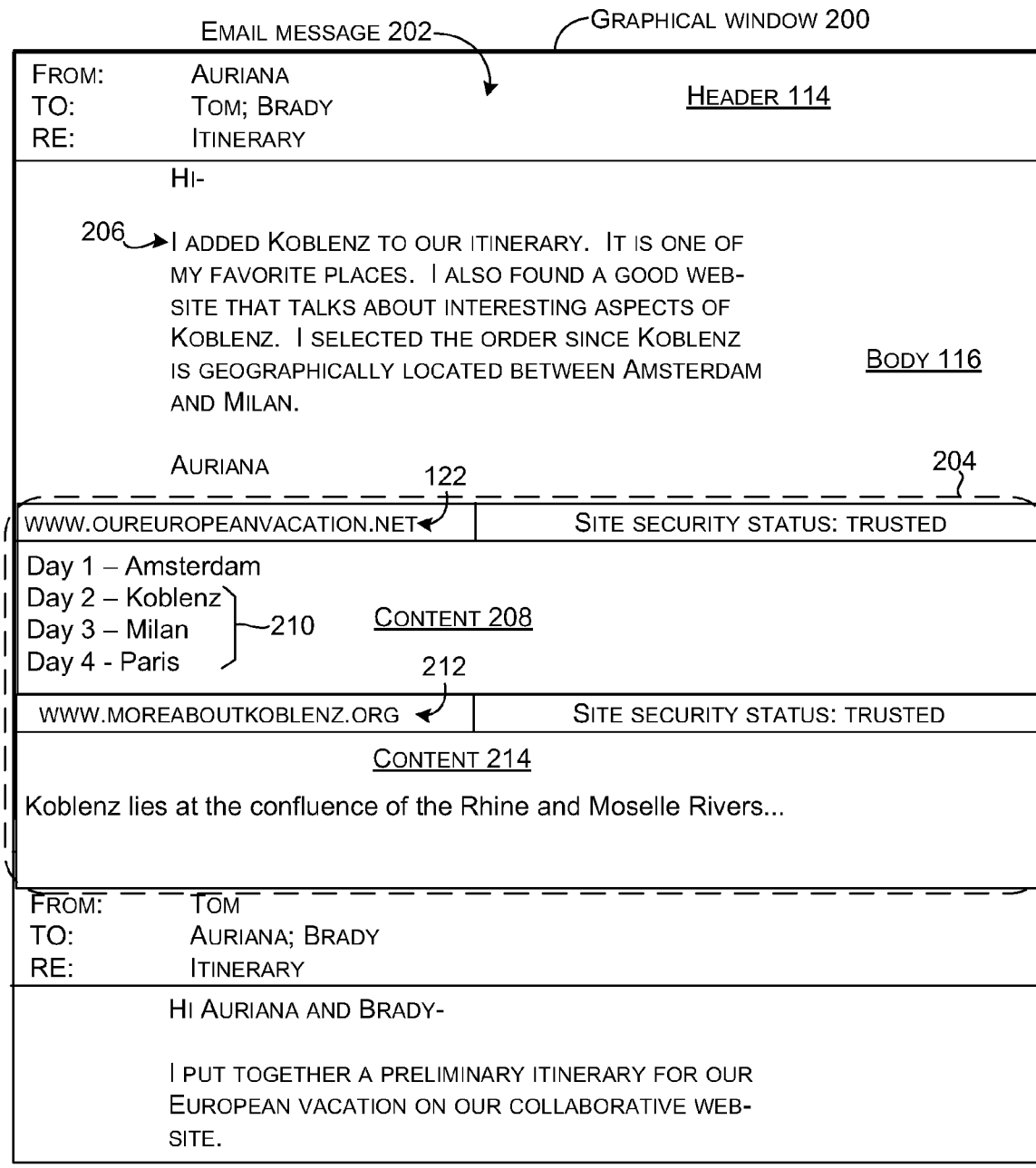
Figure 3:
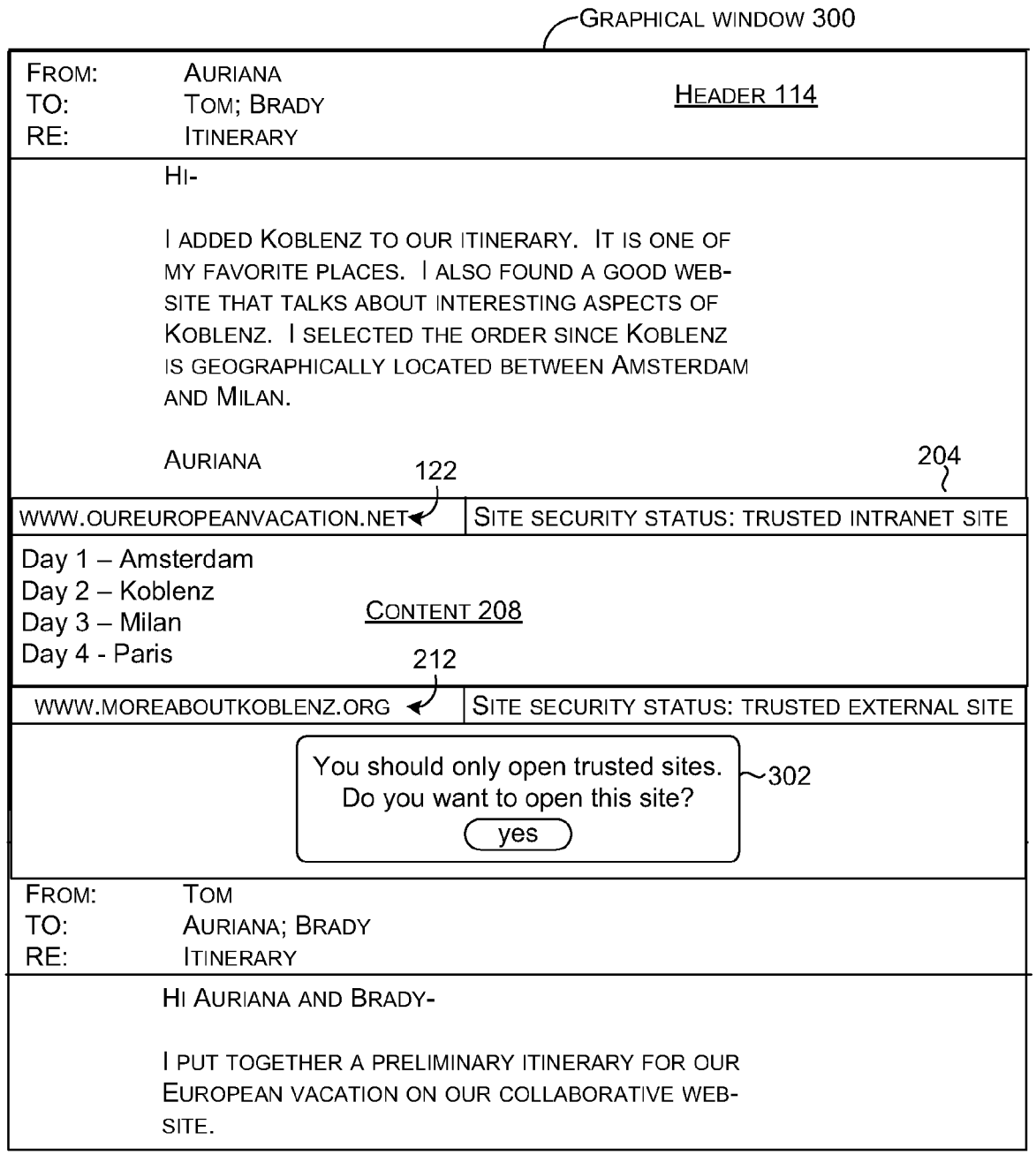

FIGS. 1-3 show exemplary hypothetical screenshots of some implementations of the present email message concepts.

FIG. 1 shows a screenshot of a graphical window 100 generated by an email application that allows a user or correspondent to view both an email message and associated or bound web content. The term correspondent can refer to an email message sender and/or receiver.

In this case, graphical window 100 includes a toolbar 102, a folders section 104, a functions section 106, and a message display area 108 for displaying an email message 110. In this instance, a first portion 112 of the message display area 108 is occupied by email message 110. Here, email message 110 includes a message header 114 and a message body 116. A second portion 118 of the message display area is occupied by content 120 from a bound web-site designated at 122. A security status of the web-site is indicated at 124.

In this example, web-site 122 is a collaborative web-site set up by the correspondents of the email (i.e., the sender "Tom" and the two recipients "Auriana" and "Brady"). The collaborative web-site allows dynamic content to be kept at a central location. Various users or correspondents can make changes to the content without worrying about multiple "versions" being created or users looking at out of date versions. While a collaborative web-site is described here other web-sites can be alternatively or additionally bound to the email message. Such an example is described below in relation to FIG. 2.

In this instance, the security status of the bound web-site 122 can be assessed for the individual recipients. If, as seen here, the web-site is deemed to be relatively safe, then the web-site content 120 can be automatically displayed. Other configurations are discussed below in relation to FIG. 3.

In the illustrated configuration of FIG. 1, a correspondent can view email message 110 as well as web-site content 120 within graphical window 100. This configuration can allow the recipient to review content in the body 116 of the email message 110 while easily referencing the web-site content 120. This feature should become more apparent in light of FIG. 2 below.

FIG. 2 shows another graphical window 200 generated by an email application that allows a user to view both an email message and associated or bound web content. In this case, an entirety of graphical window 200 defines a message display area for an email message 202 and associated/bound web content 204. Here, the email message 202 is a "reply-to-all" to email message 110 described above in relation to FIG. 1. Here, at 206 the composer "Auriana" writes that she has added a city "Koblenz" to the itinerary on their web-site 122.

The web-site 122 is shown in-line with the email message so that each of the correspondents can see the current content 208 of the web-site 122. So, in this instance, at 210 the content now reflects Koblenz at day 2 and Milan and Paris at days 3 and 4, respectively. One potential benefit of using a collaborative web-site is that the web-site content is always up to date and only a single version exists. In contrast, often multiple versions of documents can be created by the different correspondents with resultant confusion about which version is the current version.

In this case, the composer Auriana has bound another web-site 212 for display with the email message. Web-site 212 contains content 214 about Koblenz and can be easily referenced by the correspondents in-line with the content of the email message 202. In this implementation, the content from web-sites 122 and 212 can be displayed automatically with the email message on graphical window 200 without any affirmative action on the part of the email recipients. Thus, each correspondent can easily read Auriana's email message and easily refer to content of one or both of the bound web-sites 122, 212 without ever looking outside graphical window 200. In this case, content 208, 214 from bound web-sites 122, 212 respectively is displayed in the relative order in which the web-sites are linked to the email message. In other implementations, the order and/or position of the web-site content within the display area of graphical window 200 may be specified by the sender. Other implementations can have a predefined prioritized order of display. For instance, a particular implementation may present the bound web-content below the email message in the reverse order that the web-sites were bound.

FIG. 3 shows another graphical window 300 that offers an alternative to the implementation described above in relation to FIG. 2. In this implementation, the user is able to affect whether content from bound web-sites 122 and 212 are automatically displayed with the email message or not. For instance, the user may predefine a threshold security level that controls the displaying. For example, an email application may offer such a functionality that the user can access and set as desired. For instance, such a functionality may be located on a user menu, such as under a 'tools' heading. In such a configuration only bound web-sites that have an assessed risk below the threshold are automatically displayed. All other bound web-sites (i.e., those exceeding the threshold) are only opened upon approval by the user.

Assume for purposes of explanation that the user in the scenario of FIG. 3 has predefined the threshold security level so that only intranet sites are under the threshold and all external (i.e. internet sites) exceed the threshold. In this case, bound web-site 122 is an intranet site and is accordingly automatically opened and its content 208 is automatically displayed. By comparison, a dialog box 302 is presented in relation to bound web-site 212 that enables the user to decide whether to open the web-site and display the content. Other implementations may be configured, either by default of user predefinition, so that no bound web content is displayed until the user affirmatively acts to have the content displayed. For instance, a dialog box similar to dialog box 302 described above could alert the user that web-content is available for display on the graphical window 300 with the email message. The user can then select whether or not to have the content displayed with the email message.

In summary, FIGS. 1-3 illustrate implementations that allow bound web-site content to be dynamically presented in-line with an email message. The bound web-site content is dynamically presented in that the bound web-site content is obtained from a central point at the time the email message is accessed (i.e., in real time). Accordingly, the correspondents are assured that everyone is looking at the same bound web-content. Yet, the bound web-content can be presented in-line with the email message in a manner that facilitates referencing back and forth between the email message and the bound web-content. Accordingly, the bound web-site content can reflect the current state of collaborative work and/or present relevant content while the email message or messages (i.e., email chain) capture the evolution of the discussion associated with the bound web-site content. In the case of bound collaborative web-site content, some of the present implementations can be thought of as offering a hybrid between traditional email messages and collaborative web-sites. The implementations are hybrids in that the bound collaborative web-site content provides a single up-to-date record of the collaboration and is integrated with the email discussion, which can provide the history of the reasoning that led to the configuration of the bound collaborative web-site content. The email message and the bound collaborative web-site content can be presented inline together on a single display area for the user.

Exemplary Operating Environments

Figure 4:
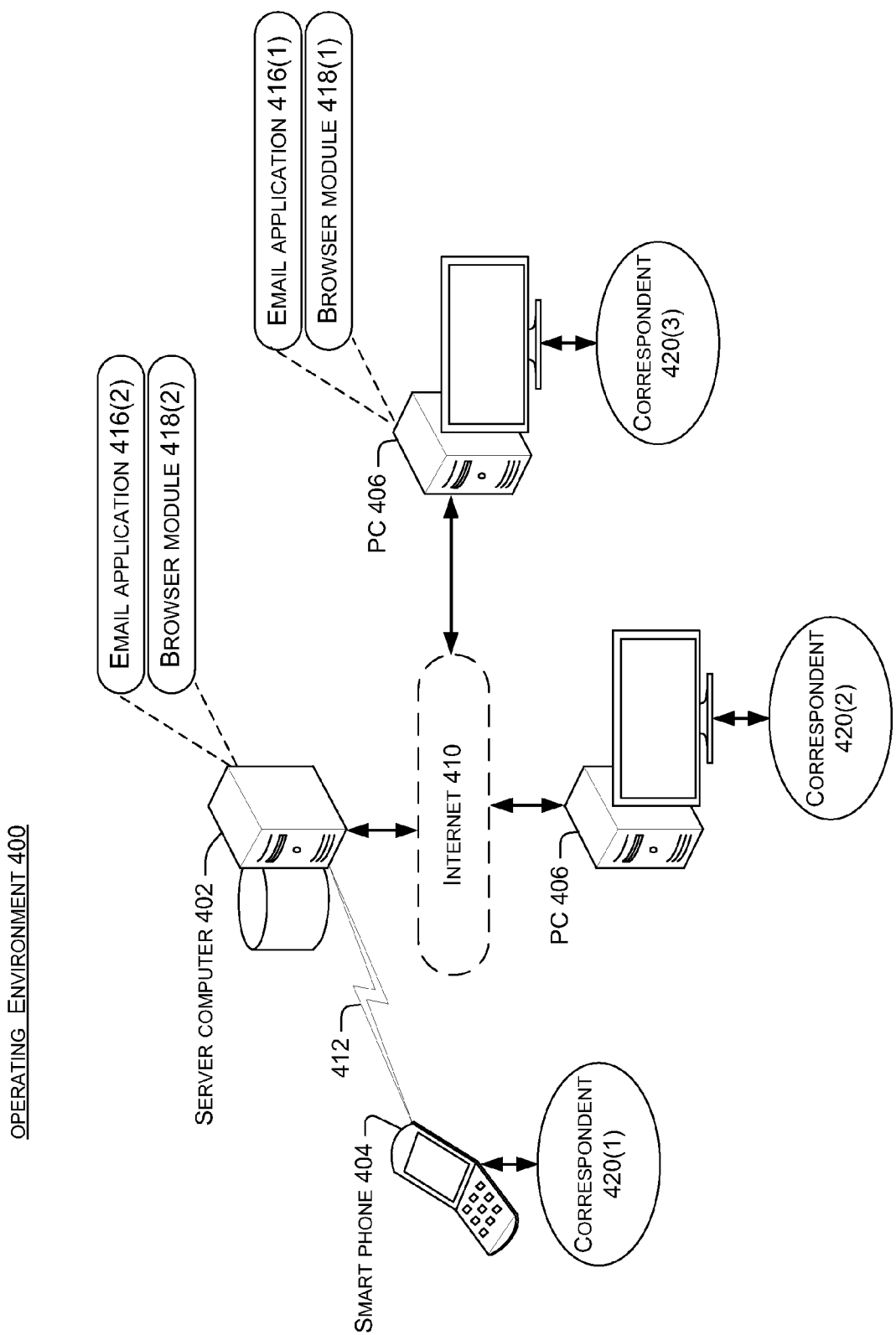
FIG. 4 illustrates an exemplary email message system in accordance with some implementations of the present concepts.

FIG. 4 shows an exemplary operating environment 400 in which email message concepts described above and below can be implemented on various computing devices. In this case, the computing devices are manifested as a server computer 402, a smart phone 404, and two personal computers 406, 408. The computing devices 402-408 can be communicably coupled with one another via the Internet 410 and/or via another communication means such as cellular microwave means 412. In the present discussion, smart phone 404 can be representative of any number of ever evolving classes of computing devices that can offer one or more of: cellular service, internet service, and some processing capabilities combined with a human interface such as a graphical interface. Other current examples of this class can include personal digital assistants and cell phones, among others.

At least some of the computing devices 402-408 can include an email application 416 and an embedded or otherwise associated browser module 418. Email application 416 can be configured to display an email message on a first portion of a graphical window for an email user or correspondent (i.e., composer and/or recipient) 420(1)-420(3). Browser module 418 can be associated with the email application to automatically retrieve and display web-site content on a second portion of the graphical window. Together, email application 416 and browser module 418 can populate the graphical window with an email message and bound web-site content.

In one configuration, the email application can generate a link preview pane which shows automatically when an email message is composed and/or viewed. The preview pane indicates that the email message is bound to a thread that has been linked to that web page.

Binding the thread, not by attachments (which are stripped or dropped by many email clients), but instead via text allows potentially any email client to be used even if it is not aware of the purpose of the text. Such a configuration facilitates use of the present implementations with cell phones, web email clients, etc. without degrading the binding data.

The present concepts can be employed with computing devices having various capabilities. For instance, the present concepts can be employed on a freestanding computing device where applications are run locally on the computing device to perform an associated functionality. PC 408 offers such an example, where email application 410(1) and browser module 412(1) run on the PC to provide exemplary email messaging functionalities for correspondent 420(3).

In other cases, the computing devices can operate in a client role of a distributed environment where some or all of the applications/modules run on server 402 and are simply displayed on the client computing device. Examples of such configurations are evidenced by smart phone 404 and PC 406 which can act as clients relative to server 402. In this example, email application 410(2) and browser module 412(2) operate on the server. Email message content and bound web-site content are processed on server 402 for display in a single graphical window. The server then defines pixels for the smart phone 404 and/or PC 406 to display to generate the graphical window for correspondents 420(1), 420(2), respectively.

From a functional aspect, the present implementations can identify links associated with an email. This function can be performed on either the client or server. For instance, in one implementation, this function is performed on the client as an extension of an email application, such as Microsoft Corporation's Outlook brand email application.

Another functionality of the present implementations can be to modify the application display to show the links in context. This functionality can be performed on the server (aka HTML email application) or the client (via whatever the client application is built in).

Exemplary Methods

FIG. 5 illustrates a flowchart of a method or technique 500 that is consistent with at least some implementations of the present concepts. The order in which the technique 500 is described is not intended to be construed as a limitation, and any number of the described blocks can be combined in any order to implement the technique, or an alternate technique. Furthermore, the technique can be implemented in any suitable hardware, software, firmware, or combination thereof such that a computing device can implement the technique. In one case, the technique is stored on a computer-readable storage media as a set of instructions such that execution by a computing device causes the computing device to perform the technique.

Block 502 allows a user to compose an email message. As used herein composing can mean originally composing, replying and/or forwarding. In some cases a graphical window is generated in which the user composes the email message.

Block 504 facilitates the user binding a web-site to the email message effective that content from the web-site can be dynamically displayed on a single window with the email message by a recipient. In some instances the facilitating can be achieved by linking the web-site in the email message so that the content from the web-site can be displayed in real-time for the recipient. So for instance, the composer of the email message can bind the web-site through a text thread that tends not to be stripped by email application as is commonly done with attachments.

FIG. 6 illustrates a flowchart of a method or technique 600 that is consistent with at least some implementations of the present concepts. The order in which the technique 600 is described is not intended to be construed as a limitation, and any number of the described blocks can be combined in any order to implement the technique, or an alternate technique. Furthermore, the technique can be implemented in any suitable hardware, software, firmware, or combination thereof such that a computing device can implement the technique. In one case, the technique is stored on a computer-readable storage media as a set of instructions such that execution by a computing device causes the computing device to perform the technique.

Block 602 displays an email message on a graphical window, wherein the email message is bound to web-content. The displaying can be performed for one or both of a sender of the email message and/or a recipient of the email message. In the case of the sender, the email message can be displayed and the sender can be given the opportunity to bind the web-content to the email message. In the case of the receiver, the email message can be displayed and the bound content can be detected and displayed as described below in relation to block 604.

Block 604 enables a recipient of the email message to have the web-content displayed with the email message on the graphical window. In some instances the enabling comprises automatically displaying the web-content with the email message on the graphical window. In other cases, the enabling includes providing information about the web-content and/or a source of the web-content to the recipient so that the recipient can decide whether to display the web-content. In some cases, the enabling can include allowing the recipient to pre-define a condition(s) such as a threshold so that web-content that satisfies the condition is automatically displayed for the recipient. In other cases, a security risk of the source (i.e., web-site) can be assessed and presented to the recipient, such as in a dialog box. The recipient can then select whether or not to have the web-content displayed.

In summary, the above techniques can unify the attributes of email messages with the attributes of web-content. Accordingly, email message users can engage in discussions via email messages while at the same time referencing web-content related to the email message. The web-content can be presented in-line with the email message to facilitate the discussion process. This configuration can allow readers to more easily maintain their train of thought as they review the email message and the web-content. Accordingly, the present implementations can foster better collaboration without requiring people to drastically change the way they work. Stated another way, the present implementations can create a hybrid environment that captures the attributes of both email and web-based experiences. This can be accomplished by binding a web-site with an email thread and displaying both in-line on a single graphical window that can show the dynamic web page content in context with the on-going email discussion.

CONCLUSION

Although techniques, methods, devices, systems, etc., pertaining to email message scenarios are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A system, comprising:
an email application configured to:
   access an email thread, the email thread comprising:
      a first email sent by a first user, the first email comprising a reference to a first web-site that is bound to the first email;
      a second email, the second email comprising a response to the first email by a second user, the second email further comprising a reference to a second web-site that is bound to the second email; and display the email thread, including the first email and the second email, wherein at least the first email is displayed on a first portion of a graphical window; and, a browser module associated with the email application and configured to:

automatically retrieve content from the first web-site based on the reference to the first web-site in the first email;

automatically retrieve content from the second web-site based on the reference to the second web-site in the second email; and concurrently display, with the email thread, the content retrieved from the first web-site and the content retrieved from the second web-site on a second portion of the graphical window, and at least one computing device configured to execute one or more of the email application and the browser module;

wherein the browser module is configured to display the content retrieved from the first web-site and the content retrieved from the second web-site in positions on the second portion of the graphical window that are at least partially defined by an order in which the references to the first web-site and the second web-site are bound to the email thread.

2. The system of claim 1, wherein the browser module is embedded in the email application.

3. The system of claim 1, wherein the browser module is configured to assess a security risk associated with the content retrieved from the first web-site and to only automatically display the content retrieved from the first web-site when the security risk is below a threshold.

4. The system of claim 1, wherein the browser module is configured to assess a security risk associated with the first web-site and to query a user for permission to display the content retrieved from the first web-site when the security risk is above a threshold.

5. The system of claim 1, wherein the email application and the browser module reside on a server computer that is communicably coupled to the computing device.

6. A method, comprising:

displaying an email thread on a graphical window, wherein the email thread includes a first email that is bound to first web-content of a first web-site via a first reference to the first web-site included in the first email, and a second email that is bound to second web-content of a second web-site via a second reference to the second web-site included in the second email;

automatically retrieving the first web-content from the first web-site using the first reference;

automatically retrieving the second web-content from the second web-site using the second reference; and enabling a recipient of the email thread to have the first web-content and the second web-content concurrently displayed with the email thread on the graphical window, wherein the first web-content of the first web-site and the second web-content of the second web-site are displayed concurrently in positions on the graphical window that are at least partially defined by an order in which the first reference and the second reference are included in the email thread.

7. The method of claim 6, wherein the first web-site comprises a collaborative web-site by which a sender of the first email and a sender of the second email collaborate by updating the first web-content.

8. The method of claim 6, further comprising:

embedding a link comprising the first reference to the first web-site in the email thread such that the recipient of the email thread can cause the first web-content of the first web-site to be displayed on the graphical window with the email thread.

9. The method of claim 6, wherein the enabling comprises automatically displaying the first web-content of the first web-site with the email thread on the graphical window.

10. The method of claim 6, wherein the enabling comprises assessing a security risk of the first web-site and presenting the security risk in a dialog box from which the recipient can select to have the first web-content of the first web-site displayed in the graphical window or select not to have the first web-content of the first web-site displayed in the graphical window.

11. The method of claim 6, wherein the enabling comprises identifying links comprising the first reference and the second reference.

12. The method of claim 6, wherein the displaying comprises adjusting the first email message so that the first web-content of the first web-site is displayed in context with the email thread in the graphical window.

13. A computer-readable storage device having instructions stored thereon that when executed by a computing device cause the computing device to perform acts, comprising:

detecting a first link to a first web-site included in a first email message of an email thread;

detecting a second link to a second web-site included in a second email message of the email thread; and, causing content from the first web-site and content from the second web-site to be:

automatically retrieved using the first link and the second link; and concurrently visualized on a common display area while displaying the email thread to a recipient of the email thread, wherein the content from the first web-site and the content from the second web-site are displayed in positions of the common display area that are at least partially defined by an order in which the first link and the second link are included in the email thread.

14. The computer-readable storage device of claim 13, wherein the causing comprises defining pixels of the common display area and communicating the defined pixels for display on a computer associated with the recipient.

15. The computer-readable storage device of claim 13, wherein the causing comprises defining pixels of the common display area and displaying the defined pixels.

16. The computer-readable storage device of claim 13, wherein the causing comprises causing the first web-content from the first web-site to be displayed in context with related portions of the first email message.

17. The system according to claim 1, wherein the first web-site comprises a collaborative web-site that is dynamically updated by the first user and the second user.

18. The system according to claim 1, wherein the content retrieved from the first web-site and the content retrieved from the second web-site are displayed without an affirmative action by recipients of the email thread.

19. The system according to claim 1, wherein the email application and the browser module are collocated on the computing device.

* * * * *